(12) United States Patent
Kim et al.

(10) Patent No.: US 8,777,270 B2
(45) Date of Patent: Jul. 15, 2014

(54) WATER SPLASH PREVENTING APPARATUS FOR VEHICLE

(71) Applicant: Hyundai Motor Corporation, Seoul (KR)

(72) Inventors: Young Shin Kim, Gyeonggi-do (KR); Yong Pyo Kim, Jeollabuk-do (KR)

(73) Assignee: Hyundai Motor Corporation, Seoul (KR)

( * ) Notice: Subject to any disclaimer, the term of this patent is extended or adjusted under 35 U.S.C. 154(b) by 0 days.

(21) Appl. No.: 13/948,515

(22) Filed: Jul. 23, 2013

(65) Prior Publication Data

US 2014/0151993 A1 Jun. 5, 2014

(30) Foreign Application Priority Data

Dec. 3, 2012 (KR) .................. 10-2012-0138706

(51) Int. Cl.
*B62D 25/18* (2006.01)

(52) U.S. Cl.
USPC ........................................... 280/851

(58) Field of Classification Search
USPC ........... 280/848, 851, 847, 849, 152.1, 152.3, 280/154
See application file for complete search history.

(56) References Cited

U.S. PATENT DOCUMENTS 7,097,208 B2 * 8/2006 Maurer et al. .............. 280/851
2011/0214568 A1 * 9/2011 Krantz .......................... 95/273

FOREIGN PATENT DOCUMENTS

| EP | 0899185 A1 | 3/1999 |
|---|---|---|
| JP | 02-256574 | 10/1990 |
| JP | 03-128775 | 5/1991 |
| JP | 07-315251 | 12/1995 |
| JP | 10-329761 | 12/1998 |
| JP | 2003-054451 A | 2/2003 |
| KR | 10-1995-0008286 | 11/1996 |
| KR | 10-2005-0104859 A | 11/2005 |
| KR | 10-2012-0090217 | 8/2012 |

* cited by examiner

*Primary Examiner* — John Walters
*Assistant Examiner* — James Triggs
(74) *Attorney, Agent, or Firm* — Edwards Wildman Palmer LLP; Peter F. Corless (57) ABSTRACT

A water splash preventing apparatus for a vehicle is provided, where the water splash preventing apparatus is disposed on a mudguard of the vehicle to prevent water splash. The water splash preventing apparatus includes a porous panel and a plurality of pockets, where the porous panel has a plurality of apertures and allows water to enter the aperture. The plurality of pockets are disposed in the porous panel to allow water to drop to an open space thereunder. Here, water splashed from a tire passes through the aperture and then drops down by colliding with an inner side of the mudguard and simultaneously bouncing off the pocket.

10 Claims, 8 Drawing Sheets

(RELATED ART)

WATER SPLASH PREVENTING APPARATUS FOR VEHICLE

CROSS-REFERENCE TO RELATED APPLICATION

This application claims under 35 U.S.C. §119(a) the benefit of Korean Patent Application No. 10-2012-0138706 filed Dec. 3, 2012, the entire contents of which are incorporated herein by reference.

BACKGROUND (a) Field of the Invention

The present invention relates to a water splash preventing apparatus for a vehicle. More particularly, the present invention relates to a water splash preventing apparatus that can improve safety for nearby vehicles by inhibiting water splash from tires in the rain.

(b) Description of the Related Art

Generally, rain water or mud splashed from the tires of trucks driving in the rain can pose a significant safety threat to passenger vehicles or trucks driving nearby.

Figure 10:
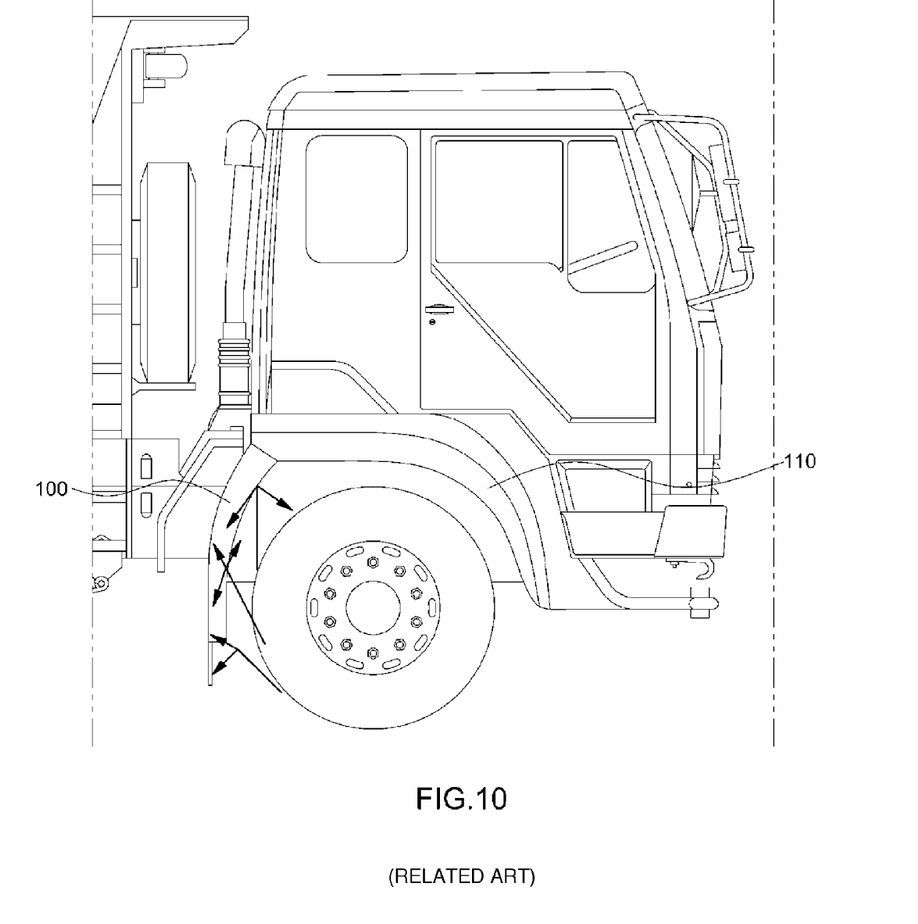
FIG. 10 (RELATED ART) is a side view illustrating a mudguard and a balance disposed in a typical commercial vehicle.

As shown in FIG. 10 (RELATED ART), trucks typically are equipped with a mudguard 100 and a balance 110 of a vehicle body that primarily block rain water or mud, but these structures are minimum deterrents, that is, they are not enough to stop water from being dispersed into small particles.

In Europe, regulations on apparatuses that can be used to prevent water splashed from tires from impacting other vehicles have been established due to concern about potential damage caused by water splashed by large trucks during the rain. In China, the establishment of similar regulations is underway.

Generally, when large trucks drive on a wet road surface, each tire splashes water in the tangential direction of the respective tire. In this case, as shown in FIG. 10, water hits the mudguard, the balance and the lower part of the vehicle body, becoming a spray form. Thus, the mudguard that surrounds the tire or the flat surface of the vehicle body becomes the cause of water spray. The water spray from tires can be mixed with ground dust, thus tainting the side view minors, disturbing the driver's rear view, and potentially endangering the safety of the driver's own vehicle when changing lanes or overtaking other vehicles. Also, water splashed from the front and rear tires of large trucks blocks the view of passenger vehicles and other trucks located in back of the large truck and puts their safety in danger.

Thus, a water splash preventing apparatus had been designated by regulation in Europe. Such apparatuses are installed on the mudguards or balances to block the splashed water or mud from being dispersed to the outside of a vehicle. For example, as water splashed from tires collides with the water splash preventing apparatus disposed on the inner side of the mudguard, its energy gets reduced, and water and air become separated from each other. The separated water returns to the ground along the inner side of the water splash preventing apparatus without forming a spray. The regulation requires the amount of returned water to be 70% or more of the splashed water. According to multiple tests, it is shown that the application of the water splash preventing apparatus can secure a clear rear viewing angle and a sufficient safety of nearby vehicles.

Korean Patent Application Publication No. 2012-0090217, Korean Patent No. 1996-0015717, Japanese Patent Application Publication No. 10-032761, European Patent Application Publication No. 0899185, Japanese Patent Application Publication No. 02-256574, and Japanese Patent Application Publication No. 03-128775 disclose various types of water splash preventing apparatuses.

However, conventional water splash preventing apparatuses are not economically feasible due to high cost, and performance may not be as high as desired due to low water recovery rate and insufficient spray inhibition effect.

The above information disclosed in this Background section is only for enhancement of understanding of the background of the invention and therefore it may contain information that does not form the prior art that is already known in this country to a person of ordinary skill in the art.

SUMMARY

The present invention provides a water splash preventing apparatus for a vehicle, which can improve safety of nearby vehicles and increase the water recovery rate by having a porous panel, a pocket and a rib to effectively inhibit water splash from tires in case of rain, and which is economical in terms of investment cost and manufacturing cost.

In one aspect, the present invention provides a water splash preventing apparatus for a vehicle, which is disposed on a mudguard of the vehicle to prevent water splash, the apparatus including: a porous panel having a plurality of apertures that allow water to enter each of the apertures; and a plurality of pockets disposed in the porous panel to allow water to drop to an open space under each of the pockets, wherein water splashed from a tire passes through the apertures and then drops down by colliding with an inner side of the mudguard and simultaneously bouncing off the pockets.

In an exemplary embodiment, a plurality of apertures disposed in the porous panel may form vertical rows, and the vertical rows may be disposed parallel to each other at a certain interval in a horizontal direction.

In another exemplary embodiment, each pocket may be opened toward a front side thereof and may protrude toward a rear side of the porous panel, may be closed at both side surfaces and upper and rear sides, and opened at a lower side thereof such that water colliding with the pocket is reflected by the both side surfaces and the upper and rear sides of the pocket to drop to an open space under the pocket by the gravity.

In still another exemplary embodiment, each pocket may include a wall blocking the rear side of the pocket, and the wall may block a total area of the rear side of the pocket only by about one-half.

In yet another exemplary embodiment, the plurality of pockets disposed in the porous panel may form vertical rows, and the vertical rows may be disposed parallel to each other between the vertical rows of the apertures, respectively.

In still yet another exemplary embodiment, the water splash preventing apparatus may further include a plurality of ribs that are disposed on the rear surface of the porous panel to serve a channel of water dropping down. In a further exemplary embodiment, each rib may be disposed just adjacent to the aperture in the porous panel to allow water passing the aperture to collide with the rib and thus to be split into smaller portions In another further exemplary embodiment, the porous panel including the apertures and the pockets may be integrally formed in one mold.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described in detail with reference to the accompanying drawings.

Figure 1:
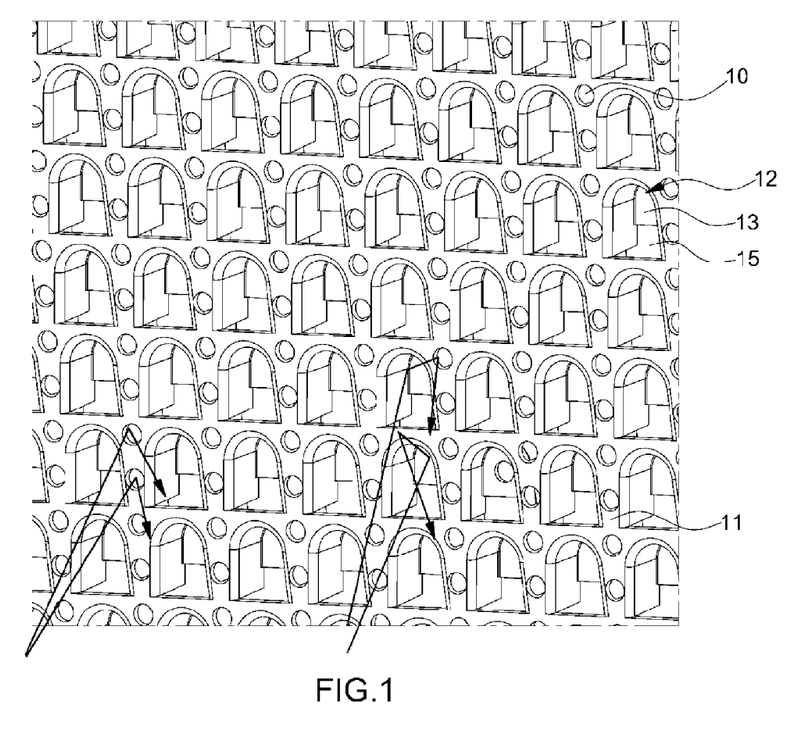
FIG. 1 is a perspective view illustrating a front side of a water splash preventing apparatus according to an embodiment of the present invention.
Figure 2:
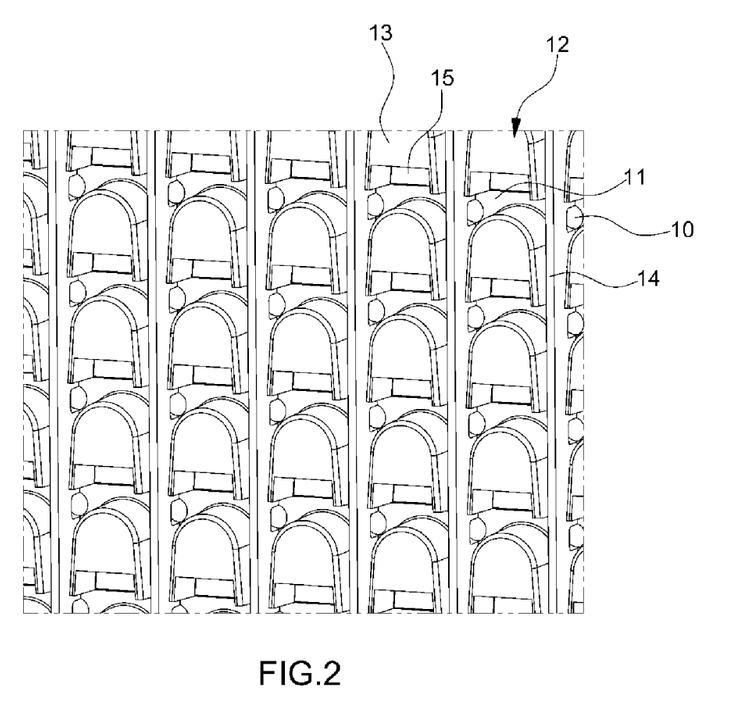
FIG. 2 is an enlarged perspective view illustrating a rear side of the water splash preventing apparatus of FIG. 1.

FIG. 1 is a perspective view illustrating a front side of a water splash preventing apparatus according to an embodiment of the present invention. FIG. 2 is an enlarged perspective view illustrating a rear side of the water splash preventing apparatus.

As shown in FIGS. 1 and 2, the water splash preventing apparatus may include a porous panel, a pocket, and a rib. Preferably a plurality of these structures are provided, such that the porous panel includes a plurality of pockets and a plurality of ribs.

When water is sprayed on a basic surface (front side) of the porous panel from a tire, the water colliding with the porous panel may flow into an aperture, colliding with the inner side of the mudguard and then dropping down due to an energy loss. On the other hand, water colliding with the pocket may be reflected by the three sides of the pocket, and may enter an open space under the pocket by gravity, thus dropping down. Also, the rib may be disposed on the rear surface of the porous panel to allow water introduced through the pocket and the aperture to gather in one place and flow down. Thus, a countercurrent of water may be prevented.

Preferably, a porous panel 11 having a rectangular plate shape is provided, and a plurality of apertures 10 may be formed over the whole area of the porous panel 11. In particular, the plurality of apertures 10 may be disposed parallel to each other while forming vertical rows. The vertical rows formed by the plurality of apertures 10 may be disposed parallel to each other at a certain interval along the horizontal direction, i.e., the right-to-left width direction of the porous panel 11.

Also, the porous panel 11 may have a plurality of pockets 12 protruding to the rear side of the porous panel 11. Each pocket 12 may be opened toward the front side and lower side, but may be closed at both side surfaces and upper and rear sides.

Thus, water colliding with the inside of the pocket 12 may be reflected by both side surfaces and upper and rear sides of the pocket, and then may drop to the open space under the pocket by gravity. The pockets 12 each may have a wall 13 that blocks the total area of the rear side of the pocket by about one-half at the upper part thereof, and may have an open region 15 thereunder. The pockets 12 may be disposed in parallel to form vertical rows in the porous panel 11. The vertical rows formed by the pockets 12 may be disposed parallel to each other between vertical rows formed by the apertures 10, respectively. Thus, the apertures 10 forming the vertical rows and the pockets 14 forming the vertical rows may be alternately disposed in the porous panel 11.

Also, the porous panel 11 may include a plurality of ribs 14 on the rear surface thereof. The plurality of ribs 14 may serve as a water channel that allows water to flow down while preventing the countercurrent of water. The ribs 14 may also be disposed parallel to each other on the rear surface of the porous panel 11 in the vertical direction. The ribs 14 may be disposed adjacent to the apertures 10 forming the vertical rows side by side. Thus, since the water passing the porous panel 11 can be split into smaller portions by the rib 14 located just behind the respective aperture 10, the water dispersion effect can be improved.

Figure 3:
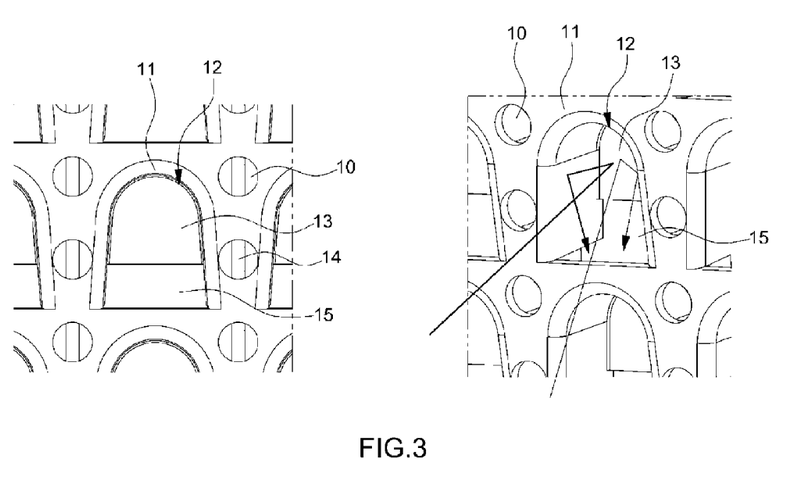
FIG. 3 is a further enlarged view illustrating the water splash preventing apparatus of FIG. 1.

Hereinafter, the functions of the water splash preventing apparatus will be described in more detail. FIG. 3 is an enlarged view of the water splash preventing apparatus. As shown in FIG. 3, when there is no water splash preventing apparatus, water splashed from the tire may be reflected by a flat surface of the mudguard. In this case, water may become sprayed.

Conventional water splash preventing apparatuses may have an uneven structure on the surface colliding with water, which reduces the reflection angle of colliding water to reduce the kinetic energy of water and thus allows water to drop down. Examples of such uneven structures include an embossing-type, a pocket-type, and a weed-type.

In contrast, the present invention provides a pocket-type uneven structure having an optimal structure for collecting water. In particular, the pocket-type uneven structure of the present invention preferably has a bell shape to reduce the energy of water splash. The pocket 12 may have a bell-like hollow structure when viewed from the front side. The rear wall 13 may have a structure blocked only by one-half. Thus, water colliding with the upper wall may be reflected, and may be blocked by surrounding walls, losing the kinetic energy thereof and thus dropping down by the weight thereof. That is, the bell-like pocket may be hollowed to allow water introduced therein to collide with the upper wall and thus drop down to the ground.

When considering the angle of water splashed from the tire falls within about 30 degrees, the lower half (about 40% lower part) of the rear wall may not actually serve as a reflection plate for reducing the energy of water. Accordingly, the lower part of the rear wall may be opened to allow foreign substances splashed from the tire such as snow/slush/ice, pebbles, lumps of dirt or clay, etc. to easily escape from the pocket. Also, the lower width of the pocket may be greater than the upper width of the pocket to easily collect water and allow foreign substances to easily pass through.

Figure 4:
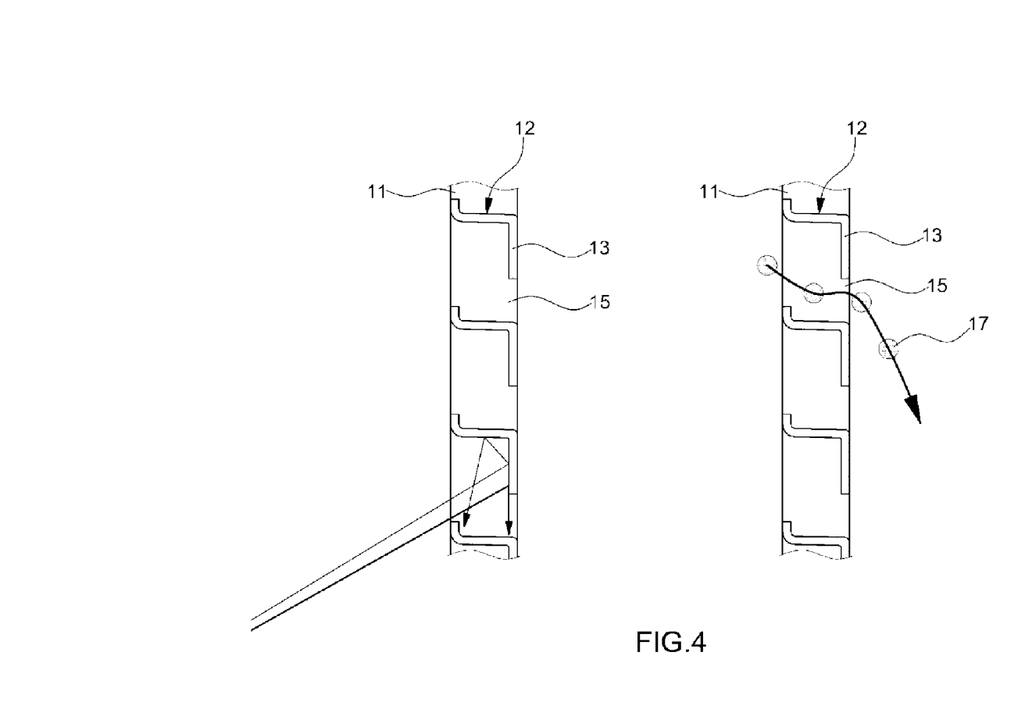
FIG. 4 is a longitudinal sectional view illustrating the water splash preventing apparatus of FIG. 1.

FIG. 4 is a longitudinal sectional view of the water splash preventing apparatus. As shown in FIG. 4, the pocket 12 may have a wall 13 blocking the rear side at the upper part thereof and the open region 15 at the lower part thereof.

When considering the angle of water splashed from the tire generally falls within about 30 degrees and considering the emission angle of the splash water, the splash water may not reach the lower part of about 40%. Accordingly, the rear wall may be closed only at the upper part thereof, and may be opened at the lower part thereof such that foreign substances can easily escape from the pocket.

In particular, the part of the rear wall that does not contact splash water may be opened such that the foreign substances 17 splashed from the tire can easily escape from the pocket. This open wall may prevent the clogging of the clay or pebbles at the pocket flow channel, and can maintain the performance of the water splash preventing apparatus.

Figure 5:
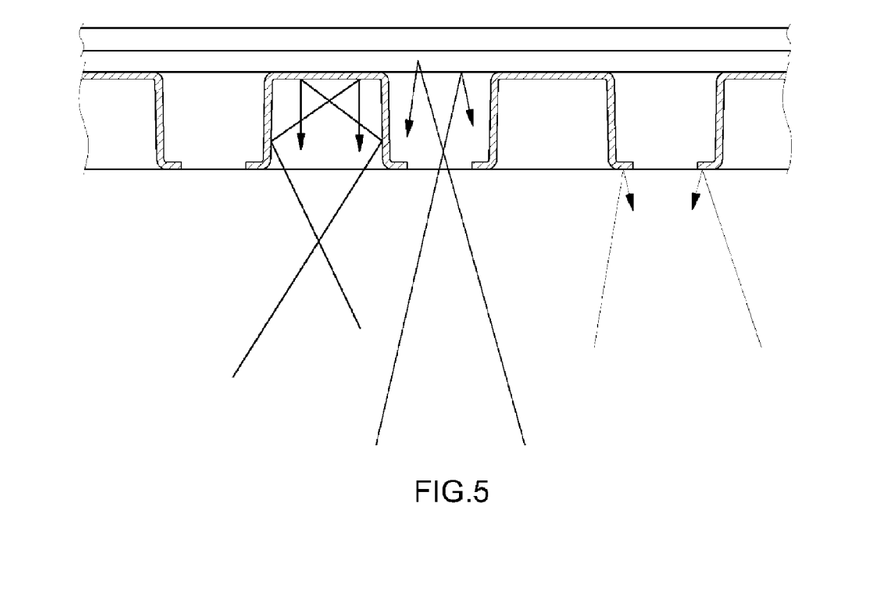
FIG. 5 is a cross-sectional view illustrating the water splash preventing apparatus of FIG. 1.

FIG. 5 is a cross-sectional view illustrating the water splash preventing apparatus. As shown in FIG. 5, the pocket-type structure can meet the water collection rate required by regulation.

However, when only the pocket 14 is provided, the size of the pocket 14 needs to be reduced to increase the contact surface with water splashed from the tire. For this reason, the opening of the pocket 14 may be reduced to hinder foreign substances from escaping. In this embodiment, the size of the pocket may be increased, and a porous structure may be applied between the pockets to increase the water recovery rate while allowing foreign substances to easily escaping from the pocket. In particular, in addition to the uneven structure, the aperture 10 having a diameter of about 6 mm may be applied to the reference surface such that a portion of water can collide with the inner side of the mudguard 16 through the aperture 10 and then drop down to the ground.

However, when too many apertures 10 are disposed or the diameter of the aperture 10 is too large or small, the reverse effect may occur. In particular, water that passes through the aperture 10 may collide with the inner side of the mudguard and bounce through the aperture 100 in a spray form, thereby being discharged while mixing a turbulent flow around the tire (in cases where the aperture is too large).

Also, in the case of rain, sludge water including clay or dust in addition to rain water may be splashed from the tire. The sludge water may clog the aperture 10 of the water splash preventing apparatus, reducing the function of the water splash preventing apparatus (in cases where the aperture is too small).

Figure 8:
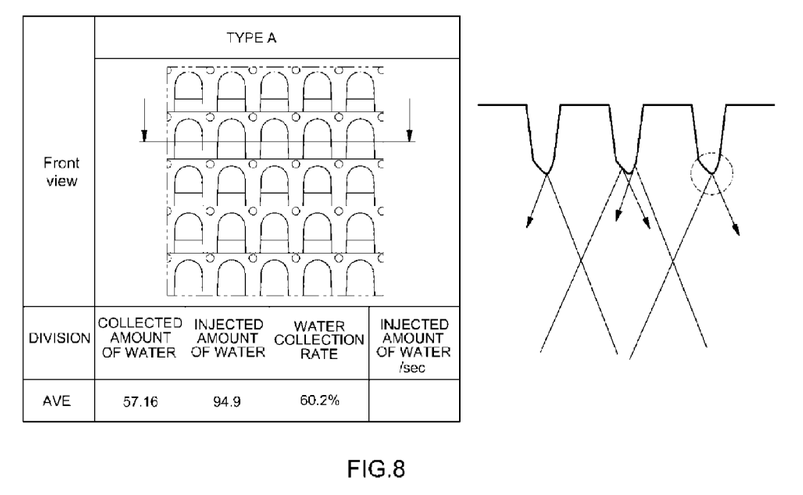
FIG. 8 is a schematic view illustrating a relation between a pocket and a porous panel to measure a water collection rate in the water splash preventing apparatus of FIG. 1.

The optimal size and number of the apertures were determined by multiple tests. First, a plane of about 10 mm was formed between pockets, and porous panels were installed every 12.5 mm in height and 25 mm in width. When the column was treated only by fillet without a space between pockets (aperture of Ø4 is disposed at the intersecting point), as shown in FIG. 8, a considerable portion of splashed water collides with the column, and thus cannot flow inside but is dispersed (reduction of water collection rate, more than 70% of legal requirements).

However, when a plane of about 10 mm is disposed between pockets, and the pocket inlet R is minimized and the size of the aperture is maximized to Ø6 except the thickness surface of the product, splashed water colliding with the plane enters the mudguard through the aperture (red color), and splashed water entering the pocket collides with the inner wall of the pocket to flow inside (yellowish green color) due to the minimum R application of the pocket inlet.

Since a plane exists between vertical apertures, water splash can be significantly reduced. However, due to limitations in the stiffness and formation of the product itself, a distance between vertical apertures needs to be about 12.5 mm. Accordingly, pores may be vertically disposed every 12.5 mm in the plane column between pockets, and the diameter of the pores may be set to Ø6 such that splashed water colliding with the wall between pockets can be effectively absorbed without dispersing.

Figure 6:
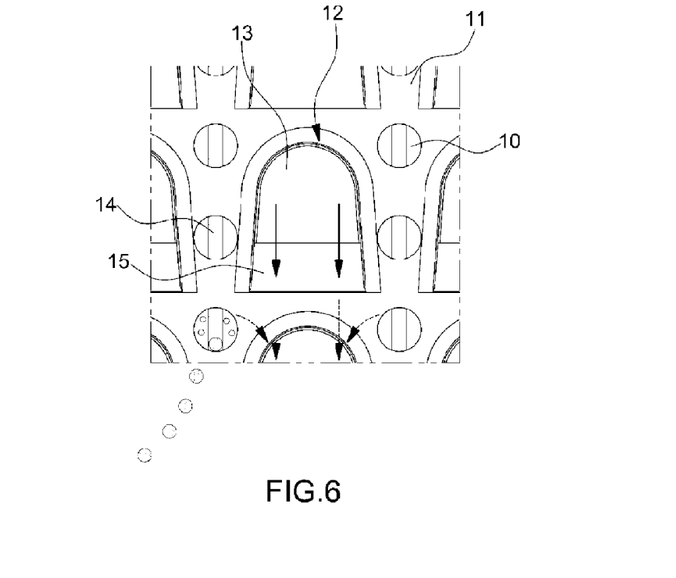
FIG. 6 is an enlarged front view illustrating a rib of the water splash preventing apparatus of FIG. 1.

FIG. 6 is a front view illustrating the role of a rib in the water splash preventing apparatus. As shown in FIG. 6, the rib 14 formed on the rear surface of the porous panel 11 may be allowed to cross the center of the rear surface of the porous panel, i.e., the center of the aperture 10 such that water passing through the aperture 10 can be split into smaller portions. The rib 14 may serve to prevent an overflow to the front side of the water splash preventing apparatus and facilitate the flow into the mudguard, by allowing water passing through the pocket 14 and the split water passing through the aperture 10 to be appropriately mixed with each other.

Figure 7:
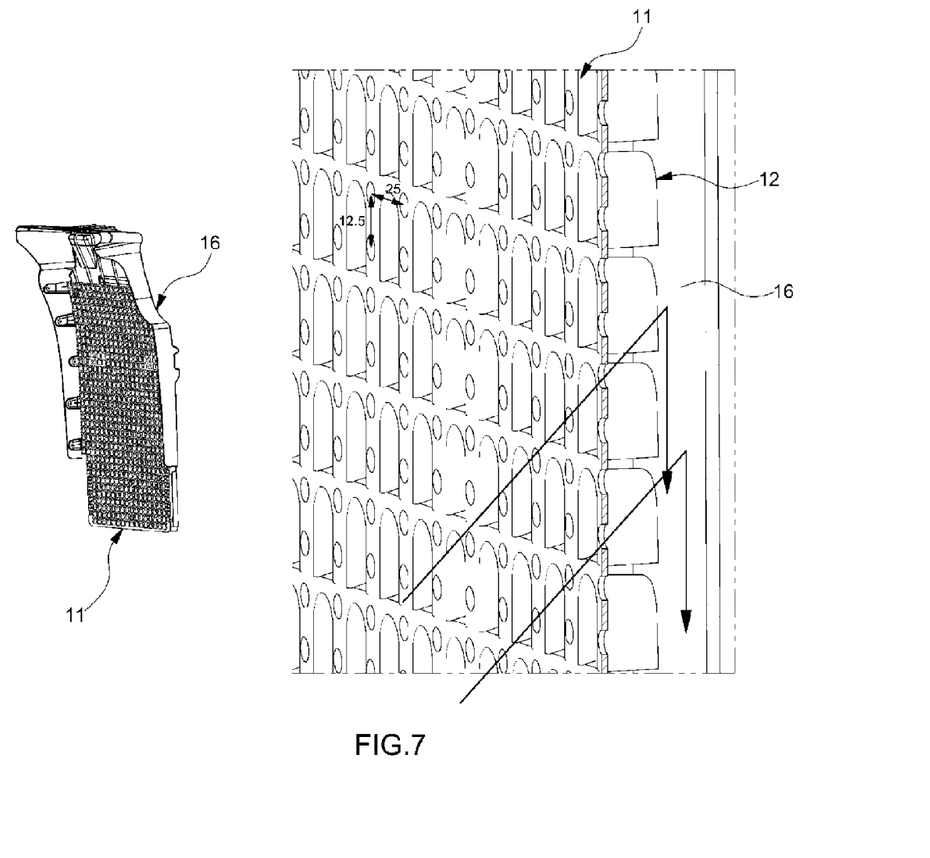
FIG. 7 is a perspective view illustrating an installation state of the water splash preventing apparatus of FIG. 1.

FIG. 7 is a perspective view illustrating an installation state of the water splash preventing apparatus. As shown in FIG. 7, the water splash preventing apparatus, i.e., the porous panel 11 having pockets may be coupled to the inner side surface of the mudguard 16. The lower end portion of the porous panel 11 may extend out of the lower end portion of the mudguard 16.

When the apertures 10 in the porous panel 11 have a diameter of Ø6 and are disposed at intervals of about 25 mm in width and 12.5 mm in height, splashed water passing through the aperture 10 may collide with the mudguard behind the porous panel 11. However, when the pores have a large diameter, splashed water colliding with the inner side of the mudguard may bounce to the outside through the aperture 10, forming water splashed from the tire and spray.

On the other hand, regarding the detail functions of the rib disposed in the porous panel 11, in the water splash preventing structure having a pocket-type structure or the porous panel, water splashed from the tire enter the aperture 10 of the porous panel 11 or the pocket, water may collide with the inner surface of the mudguard to bounce. Also, when water splashed from the tire in case of heavy rain is large in quantity, water passing through the aperture of the water splash preventing apparatus may be one-sided, causing the aperture to be temporarily clogged by splashed water and thus reducing the water splash inhibition effect. In particular, due to heavy rain or the condition of road, excessive water may be splashed to a specific part of the water splash preventing apparatus. In this case, water introduced into other pockets may be concentrated to temporarily close the flow channel and cause a countercurrent of splashed water. Temporarily, the uneven shape of the pocket may become a flat shape, and water splashed from the tire may not enter the water splash preventing apparatus but may be sprayed to the outside.

Accordingly, in this embodiment, a flow channel may be disposed on the upper surface of the porous panel to allow rain water passing the aperture to be effectively discharged along the flow channel. In particular, a vertical rib may be disposed on the rear surface of the porous panel such that the closing of the flow change due to the local concentration of water are not spread over the whole region. Thus, it could be verified that a result of testing a product in which a vertical rib is applied to the rear surface of the porous panel showed a higher water collection rate by about 5% than that without the rib.

Meanwhile, the water splash preventing apparatus according to the embodiment of the present invention has an advantage in that it can be manufactured in an integral mold. Generally, a conventional water splash preventing apparatus has a structure in which two injection-molded products are connected to each other through ultrasonic fusion or thermal fusion. In particular, the two injection-molding may be formed, and then coupled to each other. The two injection molding may incur the excessive molding investment and manufacturing cost, and may incur the detachment of the joining part. Also, since a separate injection molded product is joined with a basic flat plate, the formation shape may be restricted. Accordingly, this is mainly applied to straight or curved shape.

The water splash preventing apparatus according to the embodiment of the present invention may have an uneven structure, a porous panel, and a vertical rib on the rear surface, which can be formed in one mold without a separate joining structure. The porous panel 11 including the aperture 10, the pocket 12, and the vertical rib 14 can be integrally formed in one mold.

Figure 9:
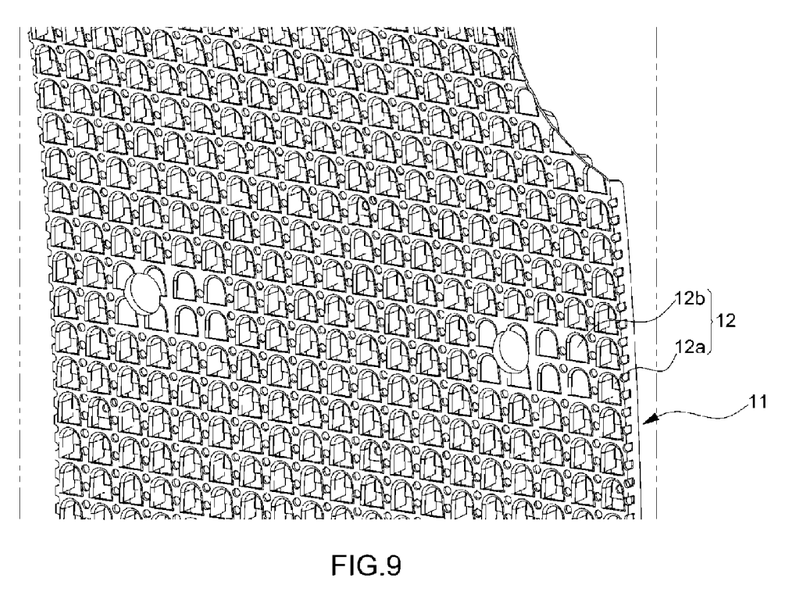
FIG. 9 is a perspective view illustrating a water splash preventing apparatus according to another embodiment of the present invention.

Also, the interval with the mudguard can be uniformly maintained by controlling the depth of the pocket in the porous panel. For example, as shown in FIG. 9, the pocket 12 formed in the porous panel 11 may include a pocket 12a having a smaller depth and a pocket 12b having a larger depth according to the shape of the mudguard, which are appropriately disposed to actively deal with the shape of the mudguard.

Thus, the present invention can promote safe driving of vehicles and can address legal requirements such as those already in effect in Europe, by achieving a water splash preventing apparatus that can effectively inhibit water splashed from the tire in case of rain.

A water splash preventing apparatus for a vehicle according to the present invention has at least the following advantages.

First, the amount of water splashed from tires can be reduced by increasing the water recovery rate using a combination type of a porous panel, one or more pockets, and one or more ribs. Thus, safer driving can be promoted, and a better rear view can be provided when overtaking other vehicles.

Second, the uniform spray control effect can be obtained regardless of the type of foreign substances such as rain, snow, mud, and pebbles.

Third, the fatigue of eyes can be reduced due to reduction of backward spray.

Fourth, since the sprayed amount from tires can be reduced, contamination of a vehicle body and a side mirror can be reduced, and thus a time loss to stop a vehicle and clean the side mirror can be saved.

Fifth, the economical feasibility can be increased. For example, the manufacturing cost can be reduced to about one-sixth, and the investment cost can also be reduced to about one-half as compared to a conventional water splash preventing apparatus.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A water splash preventing apparatus disposed on a mudguard of a vehicle, the apparatus comprising:
    a porous panel having a plurality of through apertures that allow water to pass through each of the apertures; and
    a plurality of pockets disposed in the porous panel to allow water to drop to an open space under each of the pockets,
    wherein water splashed from a tire passes through the apertures and then drops down by colliding with an inner side of the mudguard and simultaneously bouncing off the pocket.

2. The water splash preventing apparatus of claim 1, wherein the plurality of apertures disposed in the porous panel form vertical rows, and the vertical rows are disposed parallel to each other at a certain interval in a horizontal direction.

3. The water splash preventing apparatus of claim 1, wherein each of the pockets is opened toward a front side thereof and protrudes toward a rear side of the porous panel, is closed at both side surfaces and upper and rear sides, and opened at a lower side thereof such that water colliding with the pocket is reflected by the both side surfaces and the upper and rear sides of each of the pockets to allow water to drop to an open space under each of the pockets by gravity.

4. The water splash preventing apparatus of claim 1, wherein each of the pockets comprises a wall blocking the rear side of each pocket, and the wall blocks a total area of the rear side of each pocket only by about one-half.

5. The water splash preventing apparatus of claim 1, wherein the plurality of pockets disposed in the porous panel form vertical rows, and the vertical rows are disposed parallel to each other between the vertical rows of the apertures, respectively.

6. The water splash preventing apparatus of claim 1, further comprising a plurality of ribs that are disposed on the rear surface of the porous panel to serve a channel of water dropping down.

7. The water splash preventing apparatus of claim 6, wherein each of the ribs is disposed just adjacent to the apertures in the porous panel to allow water passing the apertures to collide with each respective rib and thus to be split into smaller portions.

8. The water splash preventing apparatus of claim 1, wherein the porous panel comprising the apertures and the pockets is integrally formed in one mold.

9. The water splash preventing apparatus of claim 3, wherein each of the pockets comprises a wall blocking the rear side of each pocket, and the wall blocks a total area of the rear side of each pocket only by about one-half.

10. The water splash preventing apparatus of claim 3, wherein the plurality of pockets disposed in the porous panel form vertical rows, and the vertical rows are disposed parallel to each other between the vertical rows of the apertures, respectively.

* * * * *